UNITED STATES PATENT OFFICE.

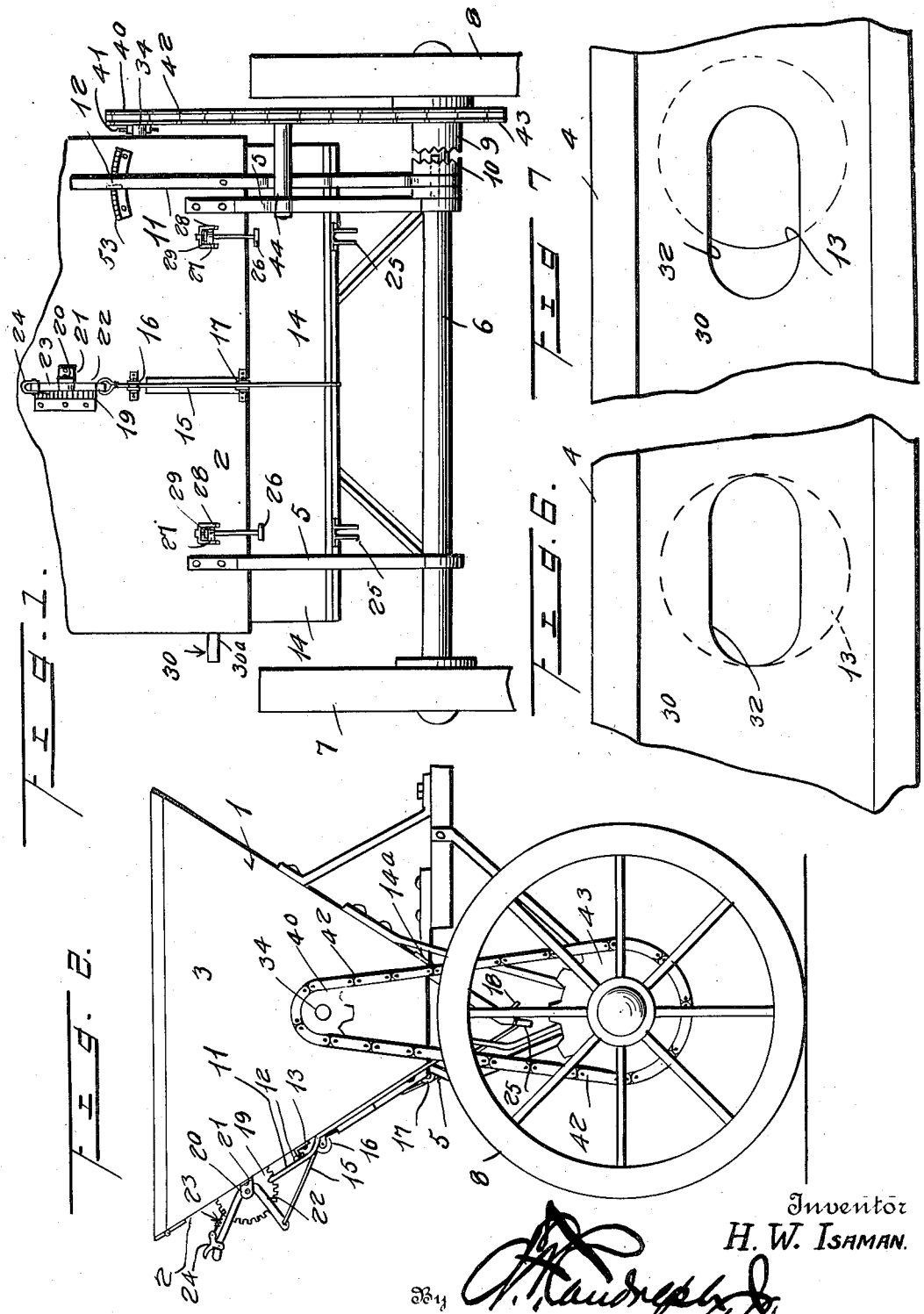

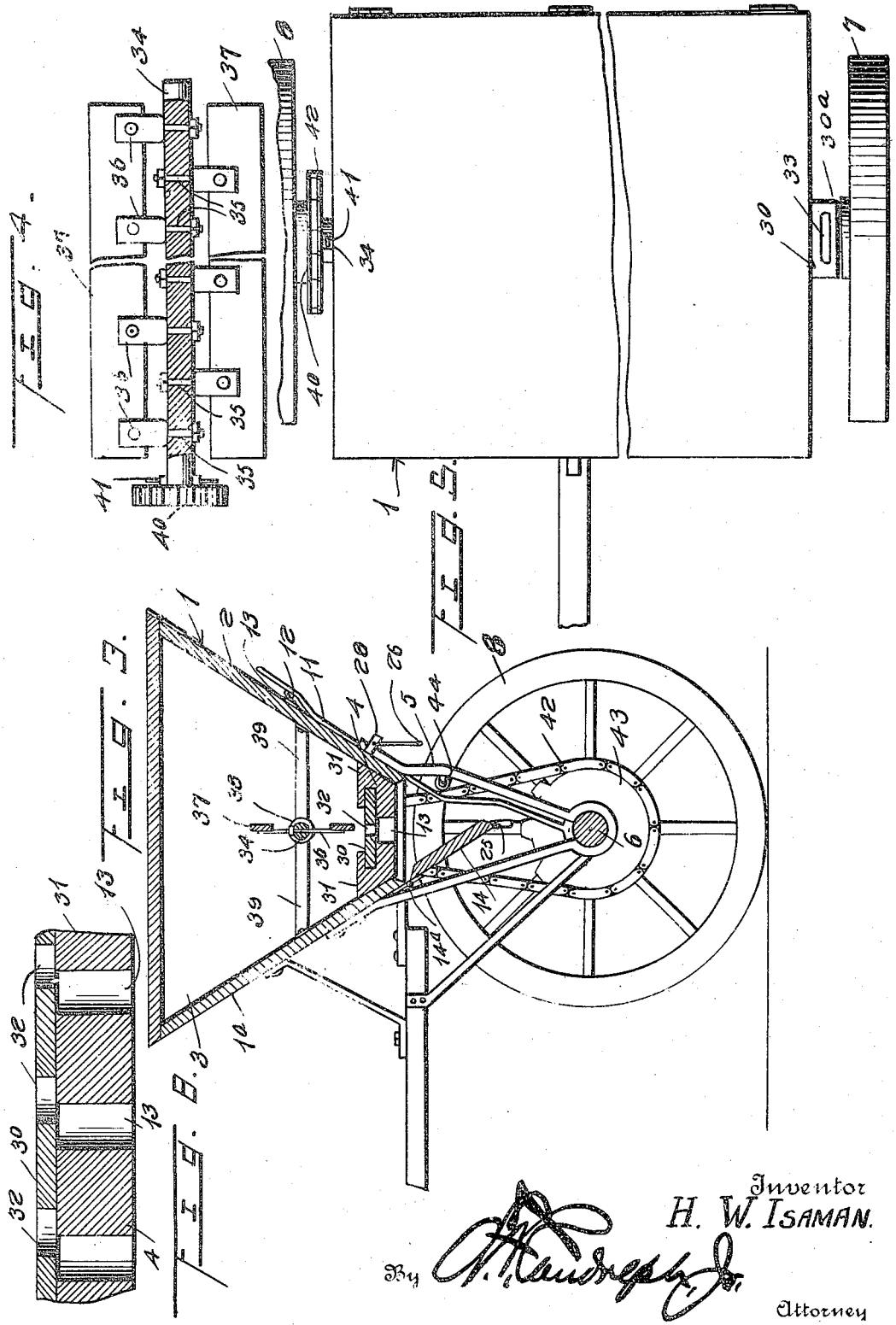

HERBERT W. ISAMAN, OF OLEAN, NEW YORK.

LIME-SPREADER.

1,299,948.  Specification of Letters Patent.  Patented Apr. 8, 1919.

Application filed August 30, 1918. Serial No. 252,056.

*To all whom it may concern:*

Be it known that I, HERBERT WESLEY ISAMAN, a citizen of the United States, residing at Olean, in the county of Cattaraugus and State of New York, have invented certain new and useful Improvements in Lime-Spreaders; and I do hereby declare the following to be a full, clear, and exact description of the invention, such as will enable others skilled in the art to which it appertains to make and use the same.

This invention relates to lime spreaders, and more particularly to a machine for distributing or spreading lime or other fertilizer for agricultural purposes.

One of the main objects of the invention is to provide a lime spreader of simple construction and operation in which the rate at which the lime is distributed or spread may be quickly and accurately regulated. A further object is to provide a spreader in which the lime will be spread in a substantially uniform sheet instead of in parallel rows or streams as in machines using discharge shoes or tubes, this machine being so constructed as to save large quantities of lime in its bulkier form, such as carbonate of lime.

Another object is to provide means whereby uniform feed of the lime is insured and clogging of the feed holes or openings is prevented, means being also provided whereby the flow of lime may be quickly and easily cut off without in anyway interfering with the means for regulating the rate of feed.

Further objects will appear from the detailed description.

In the drawings:

Figure 1 is a back view of a spreader constructed in accordance with my invention, Fig. 2 is an end view, Fig. 3 is a transverse vertical section.

Fig. 4 is a detail of the agitator,

Fig. 5 is a fragmentary top plan view,

Fig. 6 is a fragmentary detail of the means for adjusting the feed of lime, showing the parts in position for supplying the maximum amount.

Fig. 7 is a similar view with the feed openings partially closed.

Fig. 8 is a fragmentary detail section through the bottom of the lime box and the valve plate associated therewith for controlling the feed of the lime.

The box, designated generally by 1, may be of usual or any suitable construction, being of substantially V-shape in cross section and having the front wall 1, back wall 2, and end walls 3, all of which are secured together and to the bottom 4 to produce an elongated downwardly tapering box or receptacle. Suitable hangers 5 are secured to the box 1, adjacent each end thereof, and rotatably support the shaft 6 on which are mounted the ground wheels 7 and 8. The wheel 7 may be secured to the shaft 6, the wheel 8 being mounted for independent rotation thereon and provided with a clutch element 9, adapted to be engaged by a coöperating clutch element 10 feathered on shaft 6 and shifted into and out of operation by means of a shifting lever 11 pivotally mounted intermediate its ends on the back wall 2, the upper end portion of this lever being provided with a locking finger or detent 12 adapted to engage a rack plate 53 secured to the back of the box. In this manner, the wheel 8 may be optionally connected to shaft 6 for rotation therewith. When the wheel 8 is disconnected from the shaft, as in making a turn, or when the spreader is being transported from one field to another, the shaft 6 is rotatable independently of the wheel, thus providing a connection between the two wheels which will permit short turns to be readily made.

Bottom 4 of box 1 is provided with a longitudinally extending series of feed or discharge openings 13, extending therethrough. These openings are of substantially circular cross section and serve to permit the lime to be discharged from the interior of the box onto a closure and deflector plate 14, which is hingedly secured at its forward edge to the lower edge of the front wall 1 of the box, as at 14ª. This deflector plate may be raised or lowered by means of a cable 15, passed beneath and over guide pulleys 16 and 17, respectively, secured to the back of the box, the lower end of this cable being secured to an eye 18, fastened in the under face of plate 14, and the upper end of the cable being secured to the lower end of an angle lever 19, pivotally mounted intermediate its ends, and at the vertex of its angle, as at 20, in a supporting bracket 21 secured on the back of the box. This lever is positioned adjacent an arcuate rack 22, and is provided with a detent 23 coöperating with the rack and operated by a hand latch 24. By means of the lever 19 and associated parts, the plate 14 may be adjusted about its hinge axis, or this plate may be raised into completely closed position, so as to fit tightly against the under face of bottom 4 of the box, thus effectually closing the discharge openings 13, so as to cut off the discharge or flow of lime therethrough. In this manner, the plate may be used as a deflector for deflecting and evenly distributing the lime which is discharged through the openings 13 thereonto, the lime as it falls upon the plate being caused to flow rearwardly of the spreader and discharged from the rear edge of the plate in a relatively broad sheet of uniform thickness. This insures uniform distribution and spreading of the lime, avoiding uneven spreading, such as frequently occurs in spreaders using discharge chutes or tubes. When raised, the plate 14 acts as a valve for closing the openings through the bottom 4 of the box, as above stated. To insure tight closure of this plate, U-eyes 25 are secured to the under face of the plate adjacent each end thereof, these eyes being adapted to receive T-bolts 26, slidable through collars rockably supported by integral gudgeons 27 rockably mounted in U-brackets 28, secured to the back wall 2 of the box, adjusting nuts 29 being threaded on the upper ends of the bolts so as to enable the plate to be tightly secured in raised position and effectively prevent opening thereof to such an extent as to permit discharge or wastage of lime when transporting the spreader from one field to another.

To control the rate of feed of lime from the box 1, a valve plate 30 is slidably mounted on the upper face of the bottom 4 for movement longitudinally thereof in grooved guide strips 31, which are secured on the upper face of the bottom and snugly receive the edge portions of the plate. This valve plate is preferably, though not necessarily, made of band of strap iron of suitable thickness, and is provided with a longitudinally extending series of openings 32, which are spaced similarly to the openings 13 of bottom 4, and are adapted to be brought into alinement therewith. As will be noted more clearly from Figs. 6 and 7 of the drawings, the openings 32 of valve plate 30 are of substantially flattened elliptical shape, corresponding in length to the diameter of the openings 13. One end portion 30$^a$ of plate 30 projects through one end wall 3 of the box, and is provided with a transverse opening 33, so as to be readily grasped and moved longitudinally of the box. It will be understood, when the plate is in its innermost position, the openings 32 thereof will extend completely across the openings 13 of bottom 4, thus permitting the maximum amount of lime to be discharged. By moving the plate inwardly, the effective size of the openings 32 may be readily reduced, thus permitting of feed of the lime to be very easily and accurately regulated, for which purpose the plate may be provided, on the upper face of its outer end portion, with a suitable scale stamped therein. As the lime is discharged through the openings 32, it passes into the larger discharge openings 13 of the bottom 4, and, during its passage therethrough, it is thoroughly loosened and spread out, so that, upon flowing onto the inclined upper surface of the deflector plate 14, it is readily discharged from the rear edge thereof in a relatively broad sheet of uniform thickness.

To prevent stoppage or clogging of the openings 32 of the valve plate, an agitator, such as that illustrated more clearly in Fig. 4, is employed. This agitator comprises a shaft 34 through which are secured a plurality of bolts 35, these bolts being arranged in two series which are directed oppositely from the shaft. The bolts have their outer portions flattened to provide integral securing plates 36, to which are riveted the longitudinally extending beater or agitator blades 37. The shaft 34 is rotatably supported within the box 31 by means of bearing collars 38, positioned adjacent each end thereof and supported by supporting arms 39 secured to the front and back walls of the box. This shaft projects through one end of the casing or box, and is provided, beyond the end wall of the box, with a sprocket wheel 40 secured thereon by a cotter pin 41. A sprocket chain 42 is passed over sprocket wheel 40 and about a sprocket wheel 43 carried by the ground wheel 8. This chain is normally maintained at proper tension by a tightening or tensioning device of any suitable or standard construction, designated generally by 44. When the wheel 8 is rotated, rotation will be imparted to the agitator, the blades or vanes 37 of which pass closely adjacent the upper face of valve plate 30, thus effectually agitating and stirring the lime throughout the entire width and length of the bottom of the box and preventing stoppage or clogging of the openings 32 of the plate. This insures smooth and uniform feed or discharge of the lime from the box 1.

It will be evident that there may be slight changes made in the construction and arrangement of the details of my invention, and I intend to include all such variations, as fall within the scope of the appended claims, in this application in which a preferred form only of my invention is disclosed.

What I claim is:

1. In a lime spreader, a container provided with a plurality of discharge openings through its bottom wall, and a deflector and closure plate mounted beneath said container for movement toward and away from the bottom thereof, said plate being adapted to be supported in a rearwardly and downwardly inclined position so as to cause lime discharged onto the upper surface thereof to be discharged rearwardly of the spreader in a substantially uniform sheet, the plate being adapted when in completely raised position to fit tightly against the under face of the bottom of the container so as to form a closure member therefor.

2. In a lime spreader, a container provided with a plurality of discharge openings through its bottom wall, and a deflector and closure plate hingedly secured at its forward edge to the bottom of the container adjacent one edge thereof so as to be movable toward and away from said container, the plate being adapted to provide a deflector for directing lime discharged onto the upper face thereof rearwardly of the spreader in a uniform sheet, said plate being also adapted to fit tightly against the under face of the bottom of said container so as to provide a closure means therefor when in completely raised position.

3. In a lime spreader, a container provided with a plurality of openings through its bottom, a deflector and closure plate hingedly secured at its forward edge to the lower edge of the front wall of said container so as to be movable toward and away from the bottom thereof, and means for securing said plate in adjustment about its hinge axis so as to serve as a deflector for directing lime discharged onto the upper surface thereof downwardly and rearwardly of the container in a uniform sheet, or a closure member for completely closing the bottom of said container, optionally.

4. In a lime spreader, a container provided with a plurality of openings through its bottom wall, a deflector plate hingedly secured at its front edge to the front wall of said container adjacent the lower edge thereof for movement toward and away from the bottom of the container, means for adjusting said plate about its hinge axis, and means for regulating the flow of lime from within the container through the discharge openings thereof onto the upper face of the deflector plate.

5. In a lime spreader, a container provided with a plurality of discharge openings through its bottom wall, a deflector plate hingedly secured at its front edge to the front wall of said container adjacent the lower edge thereof for movement toward and away from the bottom of the container, means for adjusting said plate about its hinge axis so as to vary the inclination thereof, and a valve plate slidably mounted on the upper face of the bottom wall of the container and provided with a plurality of spaced openings adapted to be moved into and out of alinement with the openings of said bottom wall so as to regulate the flow of lime from within the container through said openings.

6. In a lime spreader, a container provided with depending hangers, a supporting axle mounted in said hangers, ground wheels mounted on the axle, said container being provided with a plurality of openings through its bottom wall, a valve plate slidably mounted on the upper face of the bottom wall of the container and provided with openings adapted to be moved into and out of alinement with the openings through said bottom wall so as to control the flow of lime therethrough from within the container, a deflector and closure plate hingedly secured at its upper edge to the front wall of said container adjacent the lower edge thereof for movement toward and away from the bottom of the container, means for securing said plate in adjustment about its hinge axis, an agitator mounted within the container and having blades operable closely adjacent the upper face of the valve plate so as to prevent clogging thereof when the agitator is rotated, and driving connections between said agitator and one of the ground wheels for rotating the same when the spreader is in operation.

In testimony whereof I affix my signature in presence of two witnesses.

HERBERT W. ISAMAN.

Witnesses:
  B. A. PARTRIDGE,
  GEO. H. PIERCE.